(12) United States Patent
Hirath et al.

(10) Patent No.: US 6,393,798 B1
(45) Date of Patent: May 28, 2002

(54) HEAT-INSULATING WALL

(75) Inventors: Jürgen Hirath, Heidenheim; Markus Schütte, Nürnberg, both of (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 0 days.

(21) Appl. No.: 09/550,214

(22) Filed: Apr. 17, 2000

Related U.S. Application Data

(63) Continuation of application No. PCT/EP98/06526, filed on Oct. 14, 1998.

(30) Foreign Application Priority Data

| Oct. 16, 1997 | (DE) | 197 45 859 |
| Oct. 16, 1997 | (DE) | 197 45 862 |
| Oct. 16, 1997 | (DE) | 197 45 825 |
| Oct. 16, 1997 | (DE) | 197 45 861 |

(51) Int. Cl.$^7$ ............................................. A47B 96/04
(52) U.S. Cl. ................... 52/788.1; 52/792.1; 428/69; 312/400
(58) Field of Search ........................ 52/788.1, 749.1, 52/309.11, 792.1, 790.1; 312/400, 406, 406.1, 409; 428/69, 75, 76; 445/70, 73; 215/13.1

(56) References Cited

U.S. PATENT DOCUMENTS

| 6,038,830 A | * | 3/2000 | Hirath et al. | ............... 52/788.1 |
| 6,053,594 A | * | 4/2000 | Wenning et al. | ............ 312/400 |

* cited by examiner

Primary Examiner—Carl D. Friedman
Assistant Examiner—Patrick J. Chavez
(74) Attorney, Agent, or Firm—Herbert L. Lerner; Laurence A. Greenberg; Werner H. Stemer

(57) ABSTRACT

A heat-insulating wall has two spaced-apart, at least essentially vacuum-tight cover layers, between which an evacuable heat-insulation material is provided and which are connected to one another by a vacuum-tight connecting profile which runs along the free edges of the cover layers. The connecting profile has a membrane which spans at least essentially the distance between the cover layers. The connecting profile is made up of a plurality of profile sections adjoining one another in a vacuum-tight manner. At the adjoining ends of the profile sections, the membrane has an end section with a thickness of at least approximately the material thickness of the cover layers.

12 Claims, 3 Drawing Sheets

HEAT-INSULATING WALL

CROSS-REFERENCE TO RELATED APPLICATION

This application is a continuation of copending International Application No. PCT/EP98/06526, filed Oct. 14, 1998, which designated the United States.

BACKGROUND OF THE INVENTION

Field of the Invention

The invention relates to a heat-insulating wall having two spaced-apart, at least essentially vacuum-tight cover layers. An evacuable heat-insulation material is disposed between the cover layers. The cover layers are connected to one another by a vacuum-tight connecting profile which runs along the free borders of the cover layers.

In the case of heat-insulating walls and housings based on vacuum-insulation technology, the wall shells are produced from high-grade sheet steel, such as stainless steel, or from corrosion-protected sheet steel and are connected to one another by a connecting profile which is secured in a vacuum-tight manner on the two wall shells by welding.

In most application cases, the connecting profile is subdivided into individual longitudinal sections in order, on the one hand, to achieve a cost-effective production for the connecting profile and, on the other hand, to be able to counteract the production tolerances and dimensional tolerances at its joint between the two wall shells. However, this modular construction of the connecting profile requires the individual longitudinal sections to be connected to one another in a vacuum-tight manner. Welding is usually used as the connecting method for producing a vacuum-tight interconnection at the joint between the individual connecting-profile longitudinal sections. Appropriate, vacuum-tight welding of the connecting profiles at their joint is difficult, in particular, when, as has already been proposed, the connecting profile, for spanning the distance between the two wall shells, is formed from a thin membrane-like wall in order to reduce the heat conduction. It is not at all possible to close of a joint between two walls having a membrane-like wall thickness in a vacuum-tight manner in a reliable fashion during a manufacturing process for a mass production, by using the known welding methods.

SUMMARY OF THE INVENTION

It is accordingly an object of the invention to provide a heat-insulating wall which overcomes the above-mentioned disadvantages of the heretofore-known heat-insulating walls of this general type and which allows, using straightforward construction measures, to configure longitudinal sections of a connecting profile of the heat-insulating wall such that a vacuum-tight connection of the profile sections at their joints is ensured. The vacuum-tight connection should be made in a reliable fashion in terms of a process that is used during the manufacturing, in particular a welding process.

With the foregoing and other objects in view there is provided, in accordance with the invention, a heat-insulating wall, including:
  two cover layers spaced-apart from one another by a given distance for providing an interspace therebetween, the cover layers being at least essentially vacuum-tight, having free borders and respectively having a material thickness;
  an evacuable heat-insulation material disposed in the interspace between the cover layers;
  a vacuum-tight connecting profile running along the free borders and connecting the cover layers to one another;
  the connecting profile being made of a plurality of profile sections with adjoining ends connected to one another in a vacuum-tight manner, the connecting profile having a membrane spanning at least essentially the given distance between the cover layers; and
  the membrane having an end region at the adjoining ends of the profile sections, the end region being thickened at least substantially to the material thickness.

In other words, the object of the invention is achieved in that, at the adjoining ends of the profile sections, the membrane has in each case one end section which is thickened at least approximately to the material thickness of the cover layers.

The term membrane in this context is intended to mean a wall which is considerably thinner than the cover layer.

Thickening the thin-walled, membrane-forming wall at its ends which form the joint between two joined-together profile sections ensures that the profile sections are interconnected at their joined-together ends in a manner which is reliable in processing terms and is appropriate for mass production. A reduced heat conduction between the cover layers, which are spaced apart one above the other, is achieved at the same time. The partial thickening of the membrane-like wall, which connects the two cover layers to one another, does not have any particularly adverse effect on the heat-insulation capacity of the heat-insulating walls and housing.

The connecting profile can be connected to the cover layers particularly straightforwardly, and in a manner which is reliable in processing terms and is appropriate for mass production, if according to an advantageous feature of the invention, the connecting profile has a U-profile-like cross section. The legs of the U-profile are secured in a vacuum-tight manner on the cover layers, while the base of the U-profile, the base being configured as a membrane, spans at least as far as possible the distance between the cover layers.

A further preferred embodiment of the invention provides that the end section of the membrane is thickened by a thickening part or reinforcing part.

Using a separate thickening part for increasing the material thickness of the membrane at its end sections makes it possible in a particularly simple and cost-effective manner, by varying the material thickness of the thickening part, to have a high level of reliability in processing terms during mass production of the heat-insulating walls. In conjunction with the use of a cross-sectionally U-profile-like connecting profile, the length of the thickening part is dimensioned at least approximately in line with the clear distance between the U-profile legs. This has the result that the thickening part can be joined to the connecting profile particularly easily, and in the correct position, in order to increase the material thickness of the end sections of the membrane since the correct position of the thickening part is determined, on the one hand, by the distance between the two U-profile legs and, on the other hand, by the free end of the membrane.

A further preferred embodiment of the invention provides that the thickening part is secured in a vacuum-tight manner on the membrane of the individual profile sections during the production thereof.

Using profile sections which have already been provided with the thickening part simplifies the operation of installing the profile sections between the cover layers to a considerable extent since this avoids the positioning of the thickening parts during the production sequence of the heat-insulating walls. As a result, the production sequence of these walls is not just quicker, but also more reliable in terms of the manufacturing process.

When a connecting profile configured as a U-profile is used, the thickening part is brought into its correct position before the welding process. The thickening part is used to help produce the profile sections during the welding process by being secured in a vacuum-tight manner on the profile sections, namely between the membrane and the leg.

Welding the thickening part or reinforcing part to the legs and the membrane of the profile section during the production process thereof ensures that there are no material deposits caused by the welding of the legs to the membrane. Such deposits may result in a leakage at the location where the thickening part is fitted. Coordinating the length of the thickening part with the clear distance between the two legs of the U-profile-like profile sections prevents a gap from being formed between the legs and those borders of the thickening part which face the legs. This considerably increases the reliability of the welding of the thickening part to the profile section during the manufacturing process.

In accordance with another feature of the invention, the thickening or reinforcing of the end sections on the membrane of a profile section can be brought about with particularly precise positioning, and without any additional positioning measures, if the end section on the membrane is thickened by way of layering, produced by multiple folding, of an extension which is integrally formed on the membrane.

In accordance with a further feature of the invention, the adjoining, thickened end sections of the membrane on the profile sections rest on a supporting element, which is secured in a vacuum-tight manner on the cover layers, and are connected in a vacuum-tight manner thereto.

Introducing supporting elements between the cover layers not only provides an installation aid in the form of a bearing or support for the individual profile sections of the connecting profiles at their joints, but also provides a supporting measure which can support the ends of the profile sections, which are to be connected to one another in a vacuum-tight manner, against the stressing forces, in the direction of the interspace filled with heat-insulation material, which are necessary in order to avoid distortion during the welding operation. Furthermore, the bearing, which serves as a supporting element, ensures that the profile sections, which are to be secured in a vacuum-tight manner in relation to the cover layers, are provided at least substantially at the same level. As a result, not only the vacuum-tight fastening along the legs of the profile sections, for example by welding, is facilitated to a considerable extent, but also the vacuum-tight connection of the ends of the profile sections to the bearing, for example likewise by welding, is made considerably easier. Increasing the material thickness at the end sections of the membrane allow the end sections to be connected in a vacuum-tight manner to the supporting elements, for example by welding, directly, without using an additional joint-covering cover profile. The bearing, which is configured as a supporting element, also allows a quick, precisely positioned introduction of the profile sections between the outer cover layers, as a result of which is it possible to dispense with additional adjusting measures necessary for connecting the profile sections in a vacuum-tight manner to the cover layers. This results in a cost-effective production for the heat-insulating walls and housing.

In accordance with a feature of the invention, the supporting element is configured as a U-profile. The thickened end sections of the membrane rest on the base of the U-profile and are connected in a vacuum-tight manner thereto.

A supporting element configured in the manner of a U-profile already has a certain dimensional stability on account of its configuration. The base, which serves as bearing or support of the joined-together ends of the profile sections and which connects the legs of the U-profile, constitutes a plane, sheet-like abutment possibility for the thickened end sections of the membrane. As a result it is possible to secure the end sections in a vacuum-tight manner on the supporting elements, for example by welding. The end sections are secured or fixed in a manner that does not require additional auxiliary measures and that is particularly reliable with regard to a manufacturing process.

In accordance with another feature of the invention, the supporting element, which is configured as a U-profile, is secured on the cover layers by way of its end surfaces.

Such an introduction of the supporting element between the cover layers considerably increases the load-bearing properties of the latter for the purpose of absorbing the stressing forces which occur during the installation of the individual profile sections, since the configuration of the legs considerably increases the moment of resistance of the supporting elements against bending. Furthermore, the heat conduction caused by the supporting element between the cover layer is minimized.

In accordance with a further advantageous feature of the invention, the supporting element, which is configured as a U-profile, is provided alongside its legs, on its end sides, with lugs or brackets which project on the leg side in relation to its base and are secured on the cover layers.

Fitting the lugs on the end sides of the supporting elements allow the latter to be fastened particularly easily and quickly on the cover layers, for example by welding. As a result, rather than having to weld at the end surfaces the U-profile, which have a rather narrow bounding, the welding operation can take place at the lugs, which have considerably larger surface areas. In addition, this also allows a vacuum-tight welding of the supporting elements to the cover layers in a manner which is reliable with regard to the production process.

In accordance with a further preferred embodiment of the invention, the supporting element is configured as a cup with at least two cup walls which are located opposite one another at least approximately in parallel and by way of which the supporting element is secured on the cover layers.

Such supporting elements can be produced particularly cost-effectively in large numbers, for example by deep-drawing thin-walled high-grade sheet steel, such as stainless steel or the like, with different geometries and supporting properties.

A heat-insulating housing and a heat-insulating door for a refrigeration appliance can be produced in a particularly durable vacuum-tight manner, along with a low weight and a low heat conduction, if the housing and/or the door include the heat-insulating wall according to the invention.

A heat-insulating oven muffle, which encloses the cooking compartment of a household oven, can be produced in a likewise particularly durable vacuum-tight manner, with a particularly low heat conduction and with a low weight, if the oven muffle includes the heat-insulating wall according to the invention.

Other features which are considered as characteristic for the invention are set forth in the appended claims.

Although the invention is illustrated and described herein as embodied in a heat-insulating wall, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
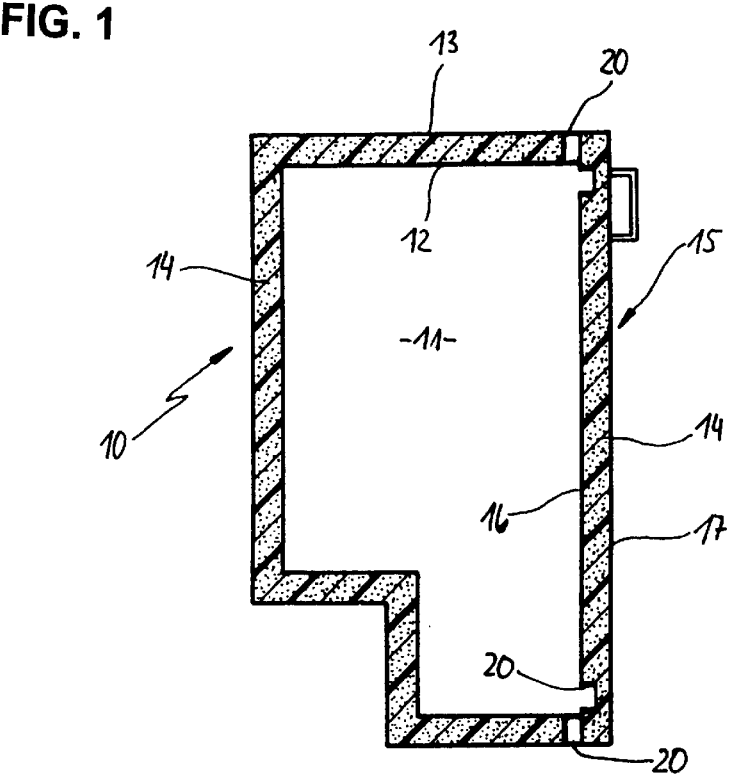
FIG. 1 is a simplified schematic sectional side view of a heat-insulating housing of a household refrigerator having two spaced-apart cover layers which are welded in a vacuum-tight manner to a connecting profile at free borders of the cover layers.

Referring now to the figures of the drawings in detail and first, particularly, to FIG. 1 thereof, there is shown a heat-insulating housing 10 which is suitable for use in a household refrigerator. The household refrigerator is based on vacuum insulation technology and has a useful space 11 which is configured as a refrigerating compartment and is lined by a cover layer 12 which serves as inner paneling and is formed, for example, from a high-grade steel sheet, such as stainless steel, or from a corrosion-protected steel sheet with a material thickness of approximately 4.0 mm or from a metal-coated or laminated plastic sheet. At a distance from the cover layer 12, the housing 10 has a further cover layer 13, which serves as outer paneling and is formed from the materials which are used for producing the cover layer 12. Introduced between the two cover layers 12 and 13 is a supporting material which serves for supporting the cover layers and is in the form of open-cell heat-insulation material 14, for example sheet-form polyurethane foam or sheet-form polystyrene foam. Such heat-insulation material is also used in a door 15, fastened on the opening border of the housing, and serves for supporting an inner cover layer 16, which forms the inner door paneling, in relation to an outer cover layer 17, which serves as outer door paneling. Both the cover layers 16 and 17 and the cover layers 12 and 13 are connected to one another in a vacuum-tight manner at their free borders by a connecting profile 20, with the result that an evacuated interspace filled with heat-insulation material 14 is formed between the two cover layers.

Figure 2:
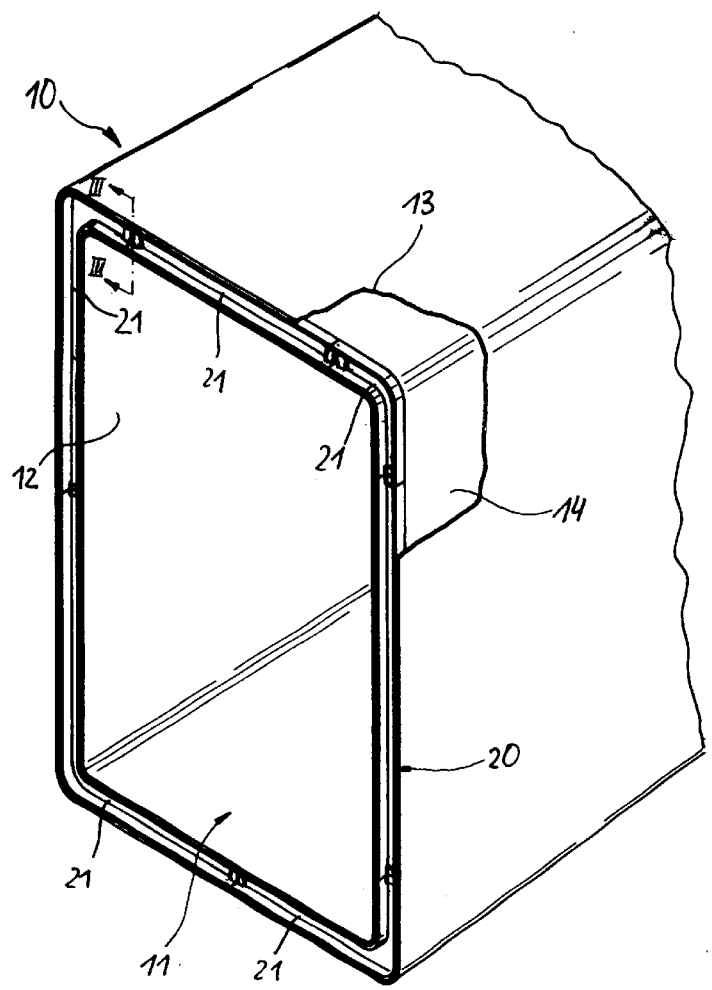
FIG. 2 is a fragmentary, three-dimensional frontal view of the housing with the connecting profile, which connects the cover layers of the housing.

As can be seen, in particular, in FIG. 2, the connecting profile 20, which is shown using the example of the heat-insulating housing 10, is subdivided along its length into a plurality of profile sections 21. The profile sections 21 are configured cross-sectionally in the form of a U-profile. The legs 22 of the U-profile are produced for example from high-grade sheet steel or corrosion-protected sheet steel and are of approximately the same material thickness as the cover layers 12 and 13. The base 23, which connects the legs 22 to one another and is configured as a membrane, is produced from sheet-like high-grade steel (stainless steel) or sheet steel with a material thickness of, for example, 0.1 mm, which is thus considerably less than the material thickness of the legs 22 and/or of the cover layers 12 and 13. The thin-walled base 23 of each profile section 21 has an end section 24 which is provided at its free end and is thicker than the material thickness of the base 23. Provided for the purpose of thickening the end section 24 is a thickening part or reinforcing part 25 which has at least approximately the same material thickness as the legs 22 and/or the cover layers 12 and 13 and, as can be seen from FIGS. 3 and 4 in particular, terminates, at least as much as possible, flush with the free end of the base 23. FIG. 5 illustrates in a diagrammatic manner a layered end section of the membrane. The layered end section can be produced by folding the membrane.

Figure 3:
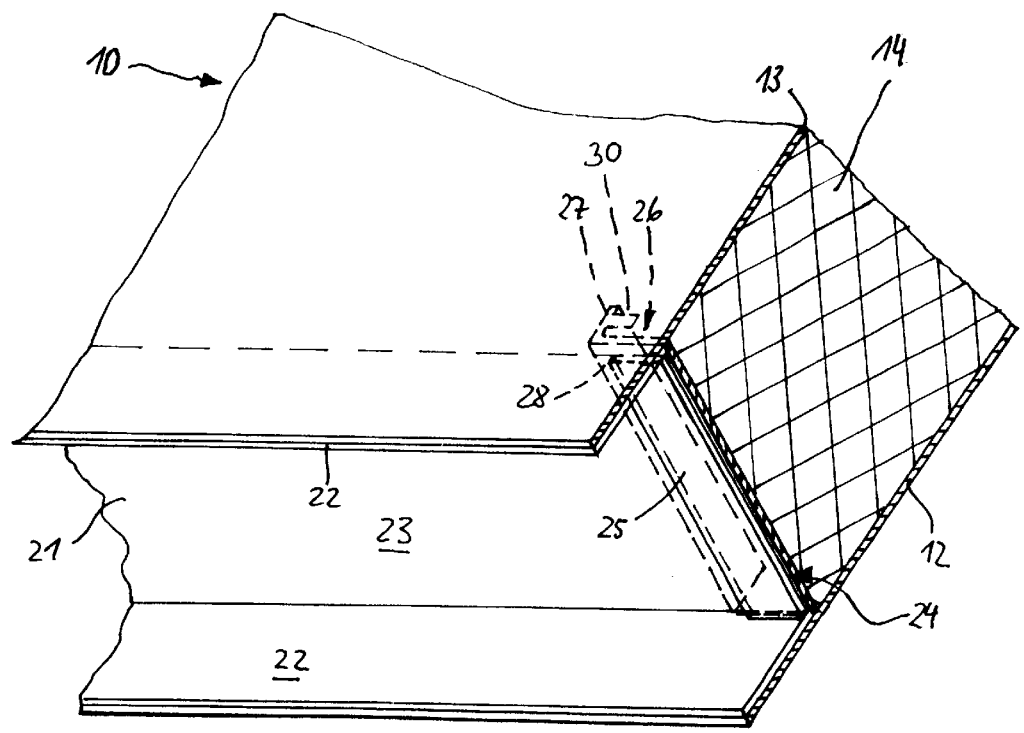
FIG. 3 is a fragmentary, three-dimensional view of an enlarged detail of the heat-insulating housing in the region of the connecting profile, which connects the two cover layers, along section line III—III.

As can be seen, in particular, from FIG. 3, the length of the thickening part 25, which is produced, for example, from high-grade steel or corrosion-protected sheet steel, is coordinated with the clear distance between the legs 22, with the result that the thickening part 25 can be introduced with the correct fit, or with a fit that is at least as correct as possible, between the two legs 22. The end sides of the thickening part 25 butt, at least as far as possible, against the insides of the legs 22, such that the insides of the legs face the end sides of the thickening part.

Figure 4:
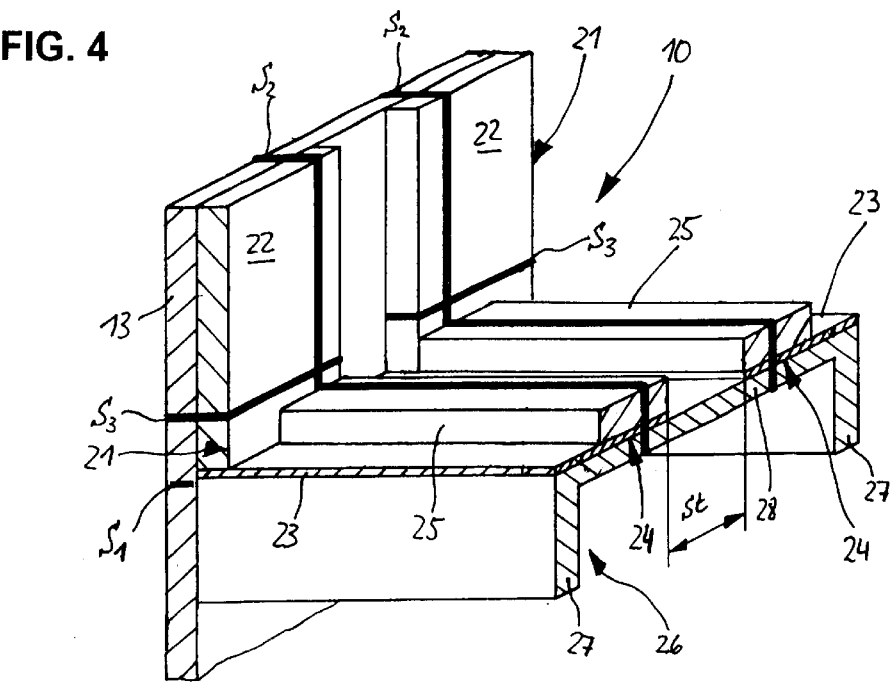
FIG. 4 is a three-dimensional sectional view of a detail of the heat-insulating housing with one of its cover layers and with the connecting profile, which is provided thereon and is joined together from a plurality of profile sections.
Figure 5:
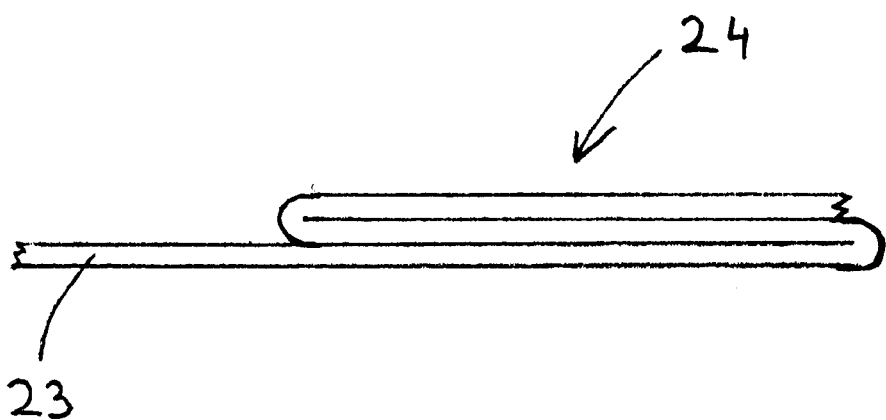
FIG. 5 is a fragmentary, diagrammatic cross-sectional view of a layered end section of the membrane.

As, in particular, FIGS. 3 and 4 show, supporting elements 26 are provided as bearings or supports for the free ends of the profile sections 21. The supporting elements 26 may be configured as a U-profile and are set back with respect to the free borders of the cover layers 12 and 13. The legs 27 of the supporting element 26 are provided transversely to the legs 22. The base 28 of the supporting element 26 serves as the bearing surface for the mutually facing ends of two adjacent profile sections 21, the ends forming a joint region St between them. By way of their end sides directed toward the cover layers 12 and 13, the supporting elements 26 are connected in a vacuum-tight manner to the cover layers 12 and 13 by a weld seam S1 which is routed along the end-side contour. For the vacuum-tight fastening of the profile sections 21 on the cover layers 12 and 13, there are provided, on the end sections resting on the supporting elements 26, two weld seams S2 which are spaced apart approximately parallel from one another. The weld seams S2 are produced, for example, by beam welding, and they pass through the layered construction, formed from the thickening part 25, the base 23 and the base 28. The weld seams S2 extend over the height of the legs 22 to the free end of the latter and connect the legs 22 and the cover layers 12 and 13 to one another. Furthermore, the legs 22 are connected in a vacuum-tight manner to the cover layers 12 and 13 by a weld seam S3 which runs in the longitudinal direction of the legs 22 and intersects the vertical section of the weld seam S2, the vertical section extending over the height of the legs 22, and the weld seam S2, for its part, intersecting the weld seam S1 again on the end side of the supporting element 26. The configuration of the weld seams S1 to S3 achieves a vacuum-tight interconnection between the profile sections 21 and the cover layers 12 and 13 by welding. At the joint region St between two profile sections, the weld seam S3 ensures the vacuum-tight interconnection between the cover layers 12 and 13 with the legs 22 extending along the cover layers 12 and 13.

The supporting element 26, which is configured as a U-profile, may be provided alongside its legs 27, on its end sides, with lugs or brackets 30 which project on the leg side in relation to its base and are secured on the cover layers 12, 13. Fitting the lugs on the end sides of the supporting elements allow the supporting elements to be fastened particularly easily and quickly on the cover layers, for example by welding. Rather than having to weld at the end surfaces of the U-profile, which have rather narrow surfaces, the welding operation can take place at the lugs, which have considerably larger surface areas.

We claim:

1. A heat-insulating wall, comprising:
   two cover layers spaced-apart from one another by a given distance for providing an interspace therebetween, said cover layers being at least substantially vacuum-tight, having free borders and respectively having a material thickness;
   an evacuable heat-insulation material disposed in the interspace between said cover layers;
   a vacuum-tight connecting profile running along said free borders and connecting said cover layers to one another;
   said connecting profile being made of a plurality of profile sections with adjoining ends connected to one another in a vacuum-tight manner, said connecting profile having a membrane spanning at least substantially the given distance between said cover layers; and
   said membrane having an end region at said adjoining ends of said profile sections, said end region being thickened at least substantially to said material thickness.

2. The heat-insulating wall according to claim 1, wherein said connecting profile has a U-shaped cross-sectional profile with legs and a base, said legs being secured to said cover layers, said base serving as said membrane and spanning at least substantially the given distance between s aid cover layers.

3. The heat-insulating wall according to claim 1, wherein said end region of said membrane is thickened by a thickening part.

4. The heat-insulating wall according to claim 3, wherein said thickening part is secured in a vacuum-tight manner to said membrane when said profile sections are produced.

5. The heat-insulating wall according to claim 1, wherein said membrane includes an extension integrally formed to said membrane, said end section of said membrane is thickened by a layered section formed by multiple folding of said extension.

6. The heat-insulating wall according to claim 1, including a supporting element fixed to said cover layers in a vacuum-tight manner, said end section of said membrane resting on said supporting element at one of said profile sections, said end section connected in a vacuum-tight manner to said supporting element.

7. The heat-insulating wall according to claim 6, wherein said supporting element is a U-profile element having a base, said end section of said membrane rests on said base and is connected to said base in a vacuum-tight manner.

8. The heat-insulating wall according to claim 7, wherein said supporting element has end surfaces secured in a vacuum-tight manner to said cover layers.

9. The heat-insulating wall according to claim 7, wherein said U-profile element further has an end side, legs extending from said base, and lugs alongside at least one of said legs at said end side, said lugs project from a side of said at least one of said legs against said base and are secured in a vacuum-tight manner to said cover layers.

10. The heat-insulating wall according to claim 7, wherein said supporting element is a cup with at least two cup walls located opposite one another and being at least approximately parallel to one another, said supporting element is secured in a vacuum-tight manner to said cover layers by said at least two cup walls.

11. In combination with a refrigeration appliance, the heat-insulating wall according to claim 1.

12. In combination with a household oven, the heat-insulating wall according to claim 1.

* * * * *